United States Patent
Thanayankizil et al.

(10) Patent No.: US 9,445,442 B2
(45) Date of Patent: Sep. 13, 2016

(54) QUALITY OF SERVICE USING A VEHICLE HEAD UNIT

(71) Applicant: GM Global Technology Operations LLC, Detroit, MI (US)

(72) Inventors: Lakshmi Thanayankizil, Rochester Hills, MI (US); Fan Bai, Ann Arbor, MI (US); David Pop, Garden City, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 16 days.

(21) Appl. No.: 14/302,095

(22) Filed: Jun. 11, 2014

(65) Prior Publication Data

US 2015/0365981 A1    Dec. 17, 2015

(51) Int. Cl.
*H04B 5/00* (2006.01)
*H04W 76/02* (2009.01)
*H04W 4/00* (2009.01)

(52) U.S. Cl.
CPC ............ *H04W 76/02* (2013.01); *H04W 4/008* (2013.01)

(58) Field of Classification Search
CPC ..... H04W 4/027; H04W 4/12; H04W 4/008; H04W 4/08; H04W 76/023; H04L 67/104; H04L 67/12; H04N 21/42207; H04N 21/43637; H04N 7/15
USPC ......... 455/41.1, 41.2; 340/870.07; 348/14.02
See application file for complete search history.

(56) References Cited

U.S. PATENT DOCUMENTS

| 8,942,888 | B2* | 1/2015 | Garrett | G06F 9/4443 340/426.17 |
| 9,032,493 | B2* | 5/2015 | Lortz | H04L 63/104 455/410 |
| 2004/0219954 | A1* | 11/2004 | Odinak | H04M 1/6075 455/569.1 |
| 2008/0120365 | A1* | 5/2008 | Lai | H04L 29/1282 709/203 |
| 2009/0322558 | A1* | 12/2009 | Videtich | H04W 4/206 340/870.07 |

(Continued)

*Primary Examiner* — Edward Urban
*Assistant Examiner* — Max Mathew
(74) *Attorney, Agent, or Firm* — Christopher DeVries; Reising Ethington P.C.

(57) ABSTRACT

A communication system and various methods using that communication system, including a method of providing short-range wireless communication (SRWC) in a vehicle. The method includes the steps of: (a) establishing a first wireless connection over a first communication channel between a vehicle multi-tainment unit (VMU) and a first mobile device, wherein, with respect to the first wireless connection, the VMU operates as a server and the first mobile device operates as a client; (b) establishing a second wireless connection over a second communication channel between the VMU and a second mobile device, wherein, with respect to the second wireless connection, the second mobile device operates as a server and the VMU operates as a client; and (c) following steps (a) and (b), controlling the second mobile device from the VMU to change the second wireless connection from the second communication channel to the first communication channel.

18 Claims, 3 Drawing Sheets

(56) References Cited

U.S. PATENT DOCUMENTS

| | | | | |
|---|---|---|---|---|
| 2011/0116415 A1* | 5/2011 | Naito | ................ | H04W 76/02 |
| | | | | 370/254 |
| 2011/0287802 A1* | 11/2011 | Ma | ................ | H04L 5/0066 |
| | | | | 455/517 |
| 2013/0070701 A1* | 3/2013 | Merlin | ................ | H04W 74/002 |
| | | | | 370/329 |
| 2013/0072116 A1* | 3/2013 | Song | ................ | H04B 7/26 |
| | | | | 455/41.1 |
| 2013/0260690 A1* | 10/2013 | Cha | ................ | H04B 7/26 |
| | | | | 566/41.2 |
| 2014/0018000 A1* | 1/2014 | Seymour | ................ | H04W 48/16 |
| | | | | 455/41.2 |
| 2014/0213175 A1* | 7/2014 | Jaisimha | ................ | H04H 20/22 |
| | | | | 455/3.06 |
| 2014/0347433 A1* | 11/2014 | Kafle | ................ | H04L 65/1069 |
| | | | | 348/14.02 |
| 2015/0065038 A1* | 3/2015 | Lee | ................ | H04W 8/24 |
| | | | | 455/41.1 |
| 2015/0201023 A1* | 7/2015 | Kotab | ................ | H04L 65/60 |
| | | | | 709/208 |
| 2015/0223157 A1* | 8/2015 | Ghosh | ................ | H04W 48/18 |
| | | | | 370/315 |

* cited by examiner

US 9,445,442 B2

QUALITY OF SERVICE USING A VEHICLE HEAD UNIT

TECHNICAL FIELD

The present invention relates to providing short range wireless communication in a vehicle, and more particularly, to controlling short range wireless communication channels between wireless devices.

BACKGROUND

Wireless communication often involves client device and server device relationships over one or more selected channels. For example, packet data may be conveyed between two wireless devices over one channel, and then due to poor transmission quality be switched to a different channel. Skilled artisans will recognize that the 802.11 specification permits the wireless server device to switch channels using extended channel switch announcement or ECSA. More specifically, ECSA enables the server device to control when to change channels, what channel to change to, and when to change channel bandwidth. However, it does not enable or permit client devices this capability.

SUMMARY

According to an embodiment of the invention, there is provided a method of providing short-range wireless communication (SRWC) in a vehicle, comprising the steps of: (a) establishing a first wireless connection over a first communication channel between a vehicle multi-tainment unit (VMU) and a first mobile device, wherein, with respect to the first wireless connection, the VMU operates as a server and the first mobile device operates as a client; (b) establishing a second wireless connection over a second communication channel between the VMU and a second mobile device, wherein, with respect to the second wireless connection, the second mobile device operates as a server and the VMU operates as a client; and (c) following steps (a) and (b), controlling the second mobile device from the VMU to change the second wireless connection from the second communication channel to the first communication channel.

According to another embodiment of the invention, there is provided a method of providing short-range wireless communication (SRWC) in a vehicle, comprising the steps of: (a) providing via a vehicle multi-tainment unit (VMU) short range wireless communication (SRWC) connectivity to a first mobile device and a second mobile device both located at the vehicle, wherein in one connection is a VMU client connection and in the other connection a VMU server connection, wherein the VMU client and VMU server connections are over different wireless communication channels; (b) determining that the first mobile device is a legacy device and the second mobile device is a non-legacy device; and (c) after steps (a) and (b), controlling from the VMU the communication channel of the second mobile device so that the communication channel of the second mobile device follows the communication channel of the first mobile device.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENT(S)

Figure 1:
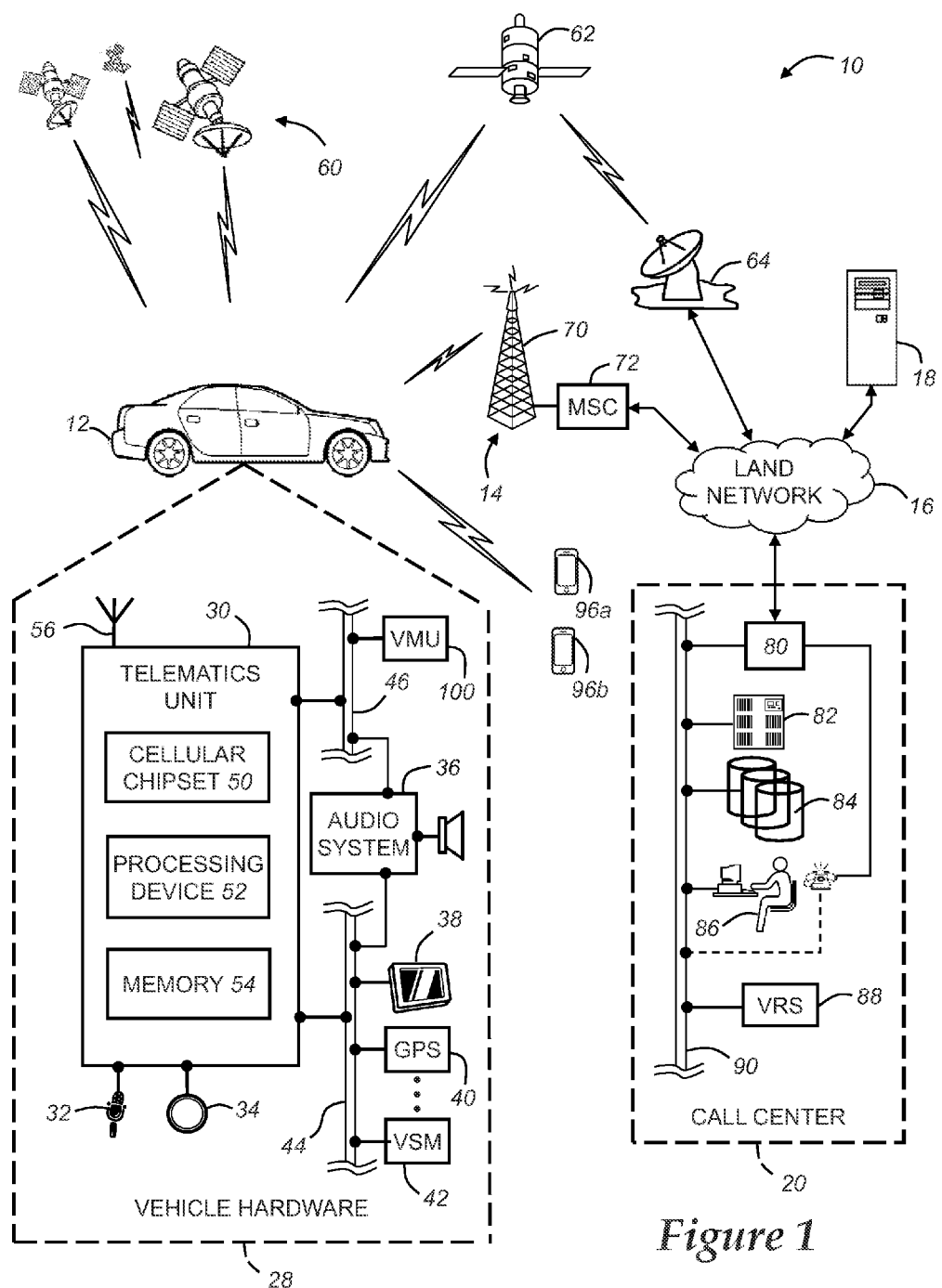
FIG. 1 is a block diagram depicting an embodiment of a communications system that is capable of utilizing the method disclosed herein.
Figure 2:
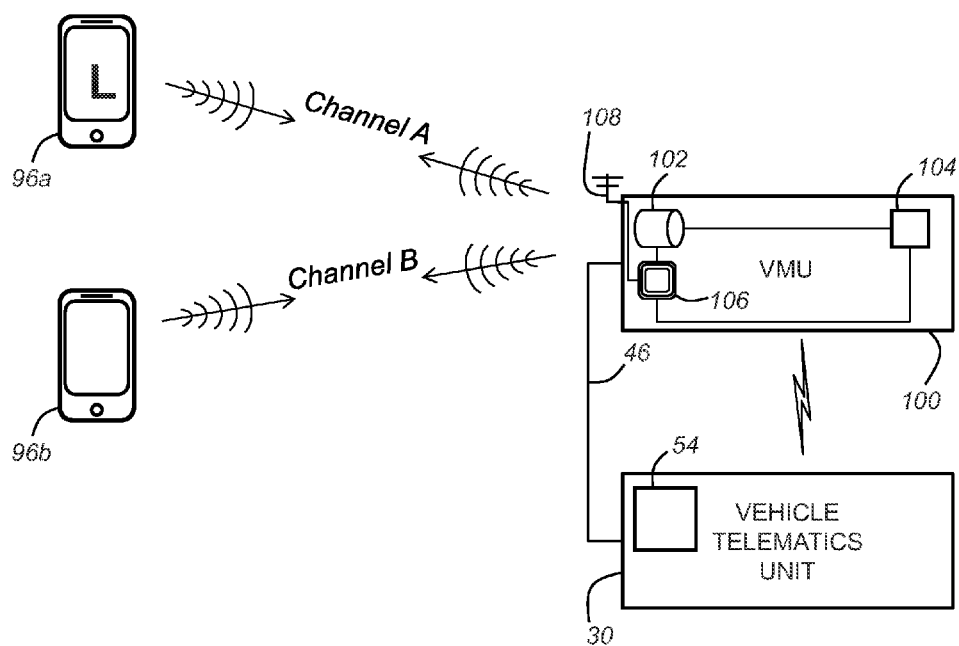
FIG. 2 is a block diagram depicting a vehicle head unit wirelessly interacting with multiple mobile devices.

The use of multiple wireless or mobile devices in a vehicle is increasingly common. In addition, vehicles have increased short range wireless communication (SRWC) interaction capability. As shown in FIGS. 1 and 2, one SRWC-capable device in a vehicle may be a vehicle head unit or vehicle multi-tainment unit (VMU) 100. The VMU 100 may provide entertainment, infotainment, and other suitable data services to the vehicle users. The wireless capabilities of the VMU 100 include operating in a wireless access point (WAP) mode providing wireless internet connectivity; operating in a peer-to-peer (P2P) mode or relationship with mobile devices (e.g., Bluetooth, Wi-Fi Direct, etc.); and even operating as a station (STA) when a mobile device is operating as a WAP or in some other server role. Moreover, some VMUs 100 can operate in these modes concurrently—e.g., interacting with multiple mobile devices located in or around the vehicle. Some mobile devices may have older technology (e.g., legacy devices) while others (e.g., non-legacy devices) have the latest hardware, software, operating platforms, etc.

Circumstances or scenarios exist where the interaction and communication of multiple mobile devices with the VMU 100 result in poor quality of service (QoS); e.g., losing data during transmission or attempted transmission (e.g., packet data loss). To illustrate, one legacy mobile device and one non-legacy mobile device may be in concurrent communication with the VMU 100. The VMU may operate as a wireless hotspot (e.g., in a WAP mode) to the legacy mobile device (which is in a STA mode); in addition, as a 'legacy' device, the mobile device may not be configured for Wi-Fi Direct, but be fully configured to communicate as a Wi-Fi client device. The VMU 100 concurrently may operate as a group client (GC) according to a Wi-Fi Direct protocol with the non-legacy mobile device which may be operating in a server mode (e.g., as the group owner or GO). Skilled artisans will appreciate that according to Wi-Fi Direct, the GO controls a power-saving or sleep mode known as Notice of Absence (NOA). According to NOA, the GO instructs the clients devices (the GCs) when to sleep and when to wake up to check for and receive communications. Thus, in the present scenario, the non-legacy mobile device (GO) may be instructing the VMU 100 to sleep while the VMU is transmitting or about to transmit packet data to the legacy mobile device. Obviously, this is an undesirable scenario as the legacy mobile device may experience packet data loss as a consequence of the interruption.

Accordingly, disclosed herein are embodiments of a system and method to improve the QoS to the legacy mobile device and prevent lost data. According to at least one embodiment, the non-legacy mobile device may follow the communication channel used by the legacy mobile device. Conventionally, the two mobile devices operate on separate channels; moreover, the server device dictates, for example, which channel to use and if/when to change channels (e.g., according to ECSA). Thus, according to the example described above, in one server-client relationship, the VMU 100 (WAP) is the server to the legacy device (STA) client. And in the other server-client relationship, the non-legacy device (GO) is the server to the head unit (GC) client. One implementation of the present disclosure then is: when the legacy device changes channels, have the non-legacy device also change—to the same channel; i.e., the non-legacy device may follow the channel used by the legacy device. In addition, the VMU 100 (GC) may indicate or control when to change the channel between it and the non-legacy device (GO). In order to accomplish this, as will be explained in greater detail below, the ECSA functionality of the non-legacy device must be altered or disabled.

Communications System—

With reference to FIG. 1, there is shown an operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that is installed in the vehicle and that enables wireless voice and/or data communication over wireless carrier system 14 and via wireless networking. This enables the vehicle to communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It will be appreciated that GSM or CDMA standards illustrate merely exemplary implementations and other standards are also possible (e.g., LTE). It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices (including a mobile device 96) can also be carried out using telematics unit 30. For this purpose, telematics unit 30 can be configured to communicate wirelessly according to one or more suitable wireless protocols including any short range wireless communication (SRWC) such as any suitable Wi-Fi standard (e.g., IEEE 802.11), Wi-Fi Direct or other suitable peer-to-peer standard, Bluetooth, WiMAX, ZigBee™, wireless infrared transmission, or various combinations thereof. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

The vehicle electronics 28 may also include a communication device such as the vehicle head unit or vehicle multi-tainment unit (VMU) 100 which may include some of the vehicle electronics previously discussed (e.g., the audio system 36, the visual display 38, etc.). Display examples of the VMU include interactive displays in the vehicle instrument panel, interactive displays embedded within the backing of vehicle seating or the vehicle headliner, and other interactive vehicle devices/displays that are portable. Thus, in some instances, the VMU 100 may be integrated (e.g., a fixture) within the vehicle 12 and in some circumstances it may be detachably fixed or detachably tethered (e.g., usable both inside and outside the vehicle).

As shown in both FIGS. 1 and 2, the VMU 100 may include all suitable electronics, software, etc. for providing vehicle entertainment and vehicle infotainment services to the vehicle users and/or occupants including memory 102 coupled to a processor or processing device 104. The VMU 100 may be coupled to (and in communication with) the telematics unit 30; e.g., by wire (via bus 46) or wirelessly using wireless chipset 106 or both.

Additionally, the chipset 106 may enable short range wireless communication (SRWC) using antenna 112 to other communication devices such as the mobile devices 96a, 96b (shown in FIG. 2). In at least some embodiments, as explained below, the SRWC between the VMU 100 and the wireless device 96a may be different than that between the VMU 100 and wireless device 96b. For example, the SRWC between VMU and device 96a may be Bluetooth or the device 96a may be receiving data as a station (STA) from the VMU acting as a wireless access point (WAP). And for example, the SRWC between the VMU 100 and the device 96b may be a peer-to-peer connection (e.g., Wi-Fi Direct) where, e.g., the VMU 100 is a group client (GC) and the mobile device 96b is a group owner (GO). Other implementations are also possible; e.g., the VMU 100 may be the GO in a peer-to-peer connection and the mobile device 96b (or another mobile device not shown) may be one of the GCs. Regardless, it should be appreciated that the VMU 100 may operate these functions concurrently—i.e., wireless data and/or communications may be transmitted via SRWC to mobile device 96*a* while wireless data and/or communications is being transmitted via SRWC to the mobile device 96*b*, even when the connection types or protocols between mobile devices differ (e.g., concurrently operating Bluetooth and Wi-Fi Direct, with different mobile devices).

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

As also shown in FIGS. 1 and 2, the operating environment may further include one or more handheld communications devices (HCDs) or mobile devices 96*a*, 96*b*. The mobile devices 96*a*, 96*b* may be electronic devices which may be used to make mobile telephone calls across a wide geographic area where transmissions are facilitated by the wireless carrier system 14 (i.e., when the mobile device is connected to the wireless carrier system).

The mobile devices 96*a*, 96*b* may further include: hardware, software, and/or firmware enabling cellular telecommunications and communications via short-range wireless communication as well as other mobile device applications. In at least one implementation, the mobile device 96*a* is a legacy (L) device. As used herein, a legacy mobile device supports the 802.11 wireless standard; however, does not support Wi-Fi Direct. Thus, while mobile device 96*a* may be capable of SRWC, this SRWC is not Wi-Fi Direct enabled. In at least one embodiment, the mobile device 96*b* is a non-legacy device; that is, it is capable of Wi-Fi Direct communication, as well as any other suitable SRWC protocols.

The hardware of the mobile devices 96*a*, 96*b* may comprise: a processor and memory (e.g., non-transitory computer readable medium configured to operate with the processor) for storing the software, firmware, etc. The mobile device processor and memory may enable various software applications, which may be preinstalled or installed by the user (or manufacturer) (e.g., having a software application or graphical user interface or GUI). One commercial implementation of a vehicle-mobile device application may be RemoteLink™, enabling a vehicle user to communicate with the vehicle 12 and/or control various aspects or functions of the vehicle—e.g., among other things, allowing the user to remotely lock/unlock vehicle doors, turn the vehicle On/Off, check the vehicle tire pressures, fuel level, oil life, etc. RemoteLink™ may also allow the user to connect with the call center 20 or the call center advisor 86 at any time.

Another commercially available implementation of a vehicle-mobile device application is MirrorLink™, enabling a mobile device to "mirror" what is located on the mobile device display to the vehicle's visual display 38 (e.g., on the VMU 100) and incorporate mobile device input/output (I/O) with in-vehicle I/O (e.g., steering wheel controls, VMU 100 controls, etc.). MirrorLink™ may utilize some forms of SRWC to accomplish this mirroring. Thus, in at least one example, mobile devices 96a, 96b may use MirrorLink™ with the VMU 100 (and/or the telematics unit 30).

Yet another commercially available implementation of a vehicle-mobile device application is Miracast™, enabling a mobile device to stream video and/or photos/images from the mobile device to the vehicle's visual display 38 (e.g., on the VMU 100). Miracast™ may utilize some forms of SRWC to accomplish this streaming, including peer-to-peer connectivity such as Wi-Fi Direct. Thus, in at least one example, the mobile device 96b may use Miracast™ with the VMU 100 (and/or the telematics unit 30).

The hardware of the mobile devices 96a, 96b also may include a display, a keypad (e.g., push button and/or touch screen), a microphone, one or more speakers, motion-detection sensors (such as accelerometers, gyroscopes, etc.), and a camera.

In addition to the aforementioned features, some mobile devices may support additional services and/or functionality such as short messaging service (SMS or texts), multimedia messaging service (MMS), email, internet access, as well as business and gaming applications.

Non-limiting examples of the mobile devices 96a, 96b include a cellular telephone, a personal digital assistant (PDA), a Smart phone, a personal laptop computer or tablet computer having two-way communication capabilities, a netbook computer, a notebook computer, or any suitable combinations thereof. The mobile devices 96a, 96b may be used inside or outside of a mobile vehicle (such as the vehicle 12 shown in FIG. 1), and may be coupled to the vehicle by wire or wirelessly (e.g., using short range wireless communication). The mobile devices 96a, 96b also may be configured to provide services according to a subscription agreement with a third-party facility or wireless/telephone service provider. It should be appreciated that various service providers may utilize the wireless carrier system and that the service provider of the telematics unit 30 may not necessarily be the same as the service provider of the mobile devices 96.

The mobile devices 96a, 96b and the vehicle 12 may be used together by person(s) known as vehicle users such as a vehicle driver and/or one or more vehicle passengers. However, the vehicle user does not need to have ownership of either mobile device 96a, 96b or the vehicle 12 (e.g., the vehicle user may be an owner or a licensee of either or both).

Method—

Figure 3:
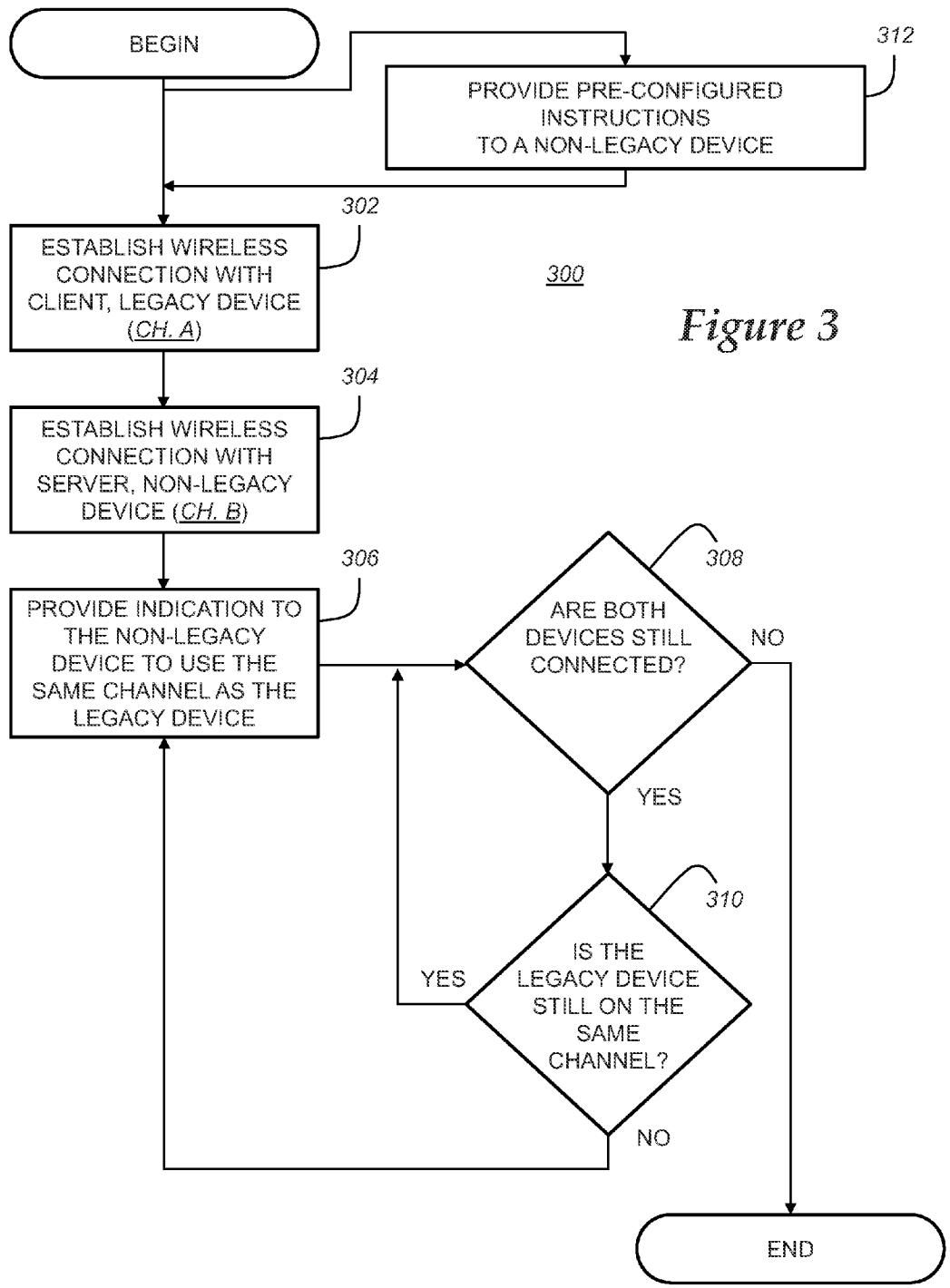
FIG. 3 illustrates a flow diagram of a method according to the present disclosure.

Turning now to FIG. 3, there is shown one embodiment of a method 300 that implements at least some of the components of the above-described communication system 10; more specifically, FIG. 3 illustrates one method of providing SRWC in a vehicle that improves Quality of Service (QoS) or QoS parameters between the VMU 100 and the mobile devices 96a, 96b. QoS parameters include connection requirements such as response time, loss, signal-to-noise (SNR) ratio, cross-talk, echo, interrupts, frequency response, loudness levels, etc. QoS may also include grade of service (GoS) requirements, as understood by skilled artisans. Higher or greater QoS may be equated providing a predetermined, minimum level of data flow performance; thus, QoS further pertains to managing bit rate, delay, jitter, packet dropping probability, and/or bit error rate. Poor QoS may inhibit the operation of some wireless applications on the mobile devices 96a, 96b; e.g., when wireless data from the VMU 100 is required to run the application. Thus, poor QoS may affect the real-time streaming of multimedia applications, online gaming, streaming radio and/or video, etc.

Beginning with step 302, the method 300 establishes a first wireless connection over a first communication channel (e.g., channel A or Ch. A) between the VMU 100 and mobile device 96a. In this implementation, mobile device 96a is a legacy device. For purposes of illustration only, in one implementation the VMU 100 operates as a wireless access point (WAP) and the mobile device 96a operates as a mobile station (STA); thus, the wireless connection may enable mobile device 96a to access the internet, email, streaming music/video, etc.

In step 304, the method 300 establishes a second wireless connection over a second communication channel (e.g., channel B or Ch. B) between the VMU 100 and mobile device 96b. In this implementation, the mobile device 96b is a non-legacy device. In one implementation, the VMU 100 operates as a group client (GC) in a peer-to-peer connection (such as Wi-Fi Direct) with the mobile device 96b operating as the respective group owner (GO). For purposes of illustration only, the mobile device 96b may utilize the wireless connection for a Miracast™ projection to the VMU 100.

It should be appreciated that while the flow diagram of FIG. 3 illustrates step 304 occurring after step 302, this is merely an example; i.e., step 304 may occur prior to step 302 instead or even at the same time. In addition, it should be appreciated that in this implementation, the VMU 100 is behaving concurrently both as a client (i.e., the GC) and as a server (i.e., the WAP). Further, skilled artisans will appreciate that other mobile devices (not shown) may also be connected to the VMU 100 and engaged in similar wireless sessions (e.g., even where the VMU 100 is the GO and a wireless device not shown is the GC—and where this too occurs concurrently with the first and second wireless connections discussed in steps 302 and 304).

After the first and second connections discussed above have been established, the method 300 may proceed to step 306 wherein the VMU 100 provides an indication to the non-legacy, mobile device 96b to use the same communication channel as the legacy, mobile device 96a. In the present instance, the indication to change communication channels may be to stop using the second communication channel and for the VMU 100 and mobile device 96b connection to use the first communication channel. Thus in this instance, both the first and second wireless connections may be over the first communication channel.

The indication provided by the VMU 100 may be provided in various ways. In one implementation, the indication may be a command transmitted from the VMU 100 to mobile device 96b to change to the specified communication channel (e.g., from the second communication channel to the first).

In another implementation, communication between the VMU 100 and the mobile device 96b may include use of a modified-ECSA (or modified extended channel switch announcement). Skilled artisans will appreciate that conventional ECSA enables a server device to notify its wirelessly connected one or more client devices of the server device's intention to change communication channels (e.g., frequencies) or the bandwidth of the present communication channel. ECSA is occasionally used when the present channel is inadequate for various reasons (e.g., a connection with poor quality of service (QoS) parameters, etc.). Unlike conventional ECSA, the modified-ECSA allows a client device such as the VMU 100 to indicate, trigger, or otherwise command the mobile device 96b to change channels—and to dictate to which communication channel to change (e.g., from the second communication channel to the first communication channel).

It should be appreciated that step 306 may include continuous monitoring of the frequencies of operation of the server and client modes in the VMU 100 to ensure that they are operating in the same frequency channel. Moreover, the term continuous may be construed broadly to include periodic monitoring; e.g., having brief periodic intervals of non-monitoring.

Following step 306, the method 300 may proceed to step 308 querying whether both mobile devices 96a, 96b are still connected (e.g., whether the first and second wireless connections still exist via the first communication channel). If the method determines that one of the mobile devices 96a, 96b has ended its wireless connection with the VMU 100, the method 300 ends; i.e., when only one of the mobile devices remains connected. However, if at least two wireless devices (e.g., 96a, 96b) remain connected, the method proceeds to step 310.

In step 310, the method 300 may determine whether the legacy device (e.g., mobile device 96a) is still on the same channel—e.g., the first communication channel. For example, if mobile device 96a is still using the first communication channel, then the method 300 proceeds to repeat step 308 (and perhaps 310). However, if the legacy device has changed channels, then the method proceeds to step 306—e.g., providing an indication to the connected clients of the change of frequency using ECSA or any other suitable standard mechanism. For example, if mobile device 96a has changed from the first communication channel to a third communication channel, the method proceeds to step 306. Thereafter, the method may proceed as previously described; e.g., changing the second wireless connection from the first communication channel to the third communication channel also; i.e., the second wireless connection follows the channel selection of the first wireless connection.

In an alternative implementation, the method 300 may include a step 312 which may precede steps 302 and/or 304. In step 312, the method may provide pre-configured instructions to the non-legacy device (e.g., the mobile device 96b). The instructions may include an ECSA-override mode that is triggerable by the VMU 100. For example, the override mode may disable the ECSA protocol that would otherwise be followed by mobile device 96b according to the peer-to-peer connection protocol (e.g., per the Wi-Fi Direct standard). With respect to being triggerable, the instructions may simply enable the VMU 100 to indicate (or trigger) that the mobile device 96b cease using ECSA (at least for a period of time or until otherwise notified).

The instructions may be provided to the mobile device 96b by the VMU 100 or by the call center 20 or other remote computer 18. For example, the VMU may provide the instructions via SRWC, or the call center or remote compute may provide them via cellular download. Certainly, other means are possible as will be appreciated by skilled artisans.

The instructions may configure the conventional ECSA protocol used by the wireless device; and in some instances, the configuration may apply only when the mobile device 96b interacts with the VMU 100. For example, the modified-ECSA or disabling-ECSA feature may only operate when the mobile device 96b identifies the VMU 100 or is communication therewith. Providing identifiers between wireless devices is known—one example may be the VMU provides its MAC address to the mobile device 96b.

The instructions have been discussed with respect to mobile device 96b—the non-legacy device; however, the instructions also may be downloaded to mobile device 96a, as circumstances may exist where the mobile device 96a acts as a server device (e.g., as a Wi-Fi hotspot) providing wireless data to the VMU 100 (e.g., as a STA).

In addition, the VMU 100 may have unique instructions that enable it to temporarily disregard ECSA protocol and command the mobile device (e.g., 96b) to change channels.

The method(s) discussed above may be performed as one or more computer programs executable by one or more mobile devices 96a, 96b or the vehicle multi-tainment unit 100 to cause the system to perform the method. The various method related data may be stored in any suitable memory (e.g., memory 102 at the VMU or any suitable memory at the mobile devices). The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer usable or readable medium, which include one or more storage devices or articles. Exemplary computer usable storage devices include conventional computer system RAM (random access memory), ROM (read only memory), EPROM (erasable, programmable ROM), EEPROM (electrically erasable, programmable ROM), and magnetic or optical disks or tapes. It is therefore to be understood that the methods may be at least partially performed by any electronic device(s) capable of executing the above-described functions.

In at least one embodiment, the performed method(s) include computer programs executable using the VMU processor 104 and memory 102 and/or the mobile device processor and memory (including mobile device software stored thereon).

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of providing short-range wireless communication (SRWC) in a vehicle, comprising the steps of:
   (a) establishing a first wireless connection over a first short range wireless communication (SRWC) channel between a vehicle multi-tainment unit (VMU) and a first mobile device, wherein, with respect to the first wireless connection, the VMU operates as a server to provide content data to the first mobile device which operates as a client;
   (b) establishing a second wireless connection over a second SRWC channel between the VMU and a second mobile device, wherein, with respect to the second wireless connection, the second mobile device is configured to operate as a server to provide content data to the VMU which operates as a client, wherein, when the second mobile device operates as the server, it selects which SRWC channel to use; and
   (c) following steps (a) and (b),
      determining at the VMU that the first wireless connection is using a different SRWC channel than the second wireless connection; and
      in response to that determination, sending a message from the VMU to the second mobile device via the second SRWC channel, wherein the message includes a request from the VMU that the second mobile device select the first SRWC channel.

2. The method of claim 1, wherein the second connection is a peer-to-peer (P2P) connection.

3. The method of claim 2, wherein the peer-to-peer (P2P) connection is Wi-Fi Direct.

4. The method of claim 1, wherein the first mobile device is a legacy device, wherein the second mobile device is a non-legacy device.

5. The method of claim 1, further comprising, in response to sending the message, receiving an indication at the VMU that the second mobile device has changed the channel used in the second wireless connection from the second SRWC channel to the first SRWC channel.

6. The method of claim 5, wherein the message sent by the VMU is used by a software application on the second mobile device that modifies or overrides an extended channel switch announcement (ECSA) feature of the second mobile device.

7. The method of claim 1, wherein the message sent in step (c) disables ECSA (extended channel switch announcement) between the VMU and the second mobile device.

8. The method of claim 1, further comprising the steps of:
   selecting at the VMU a third SRWC channel for communication with the first mobile device over the first wireless connection;
   changing the SRWC channel of the first wireless connection from the first SRWC channel to the third SRWC channel; and
   based on changing the SRWC channel of the first wireless connection, sending a second message from the VMU to the second mobile device, wherein the second message includes a request from the VMU that the second mobile device select the third SRWC channel.

9. The method of claim 1, wherein the VMU operates in an access point mode during the first wireless connection, wherein the VMU operates in a group client mode during the second wireless connection, wherein the VMU is operable as a group owner in a third wireless connection between the VMU and a third mobile device.

10. The method of claim 9, wherein the first and second wireless connections are concurrent, or wherein the first, second, and third wireless connections are concurrent.

11. The method of claim 1, wherein the second wireless connection includes a Mirrorlink session or a Miracast session.

12. A method of providing short-range wireless communication (SRWC) in a vehicle, comprising the steps of:
   (a) providing at the vehicle via a vehicle multi-tainment unit (VMU) short range wireless communication (SRWC) connectivity to a first mobile device and to a second mobile device, wherein the VMU operates as a server with respect to the first mobile device, wherein the second mobile device operates as a server with respect to the VMU;
   (b) determining that the first mobile device is a legacy device and the second mobile device is a non-legacy device; and
   (c) after steps (a) and (b), performing the steps of:
      (c1) using an extended channel switch announcement (ECSA) mode at the VMU, changing a SRWC channel between the VMU and the first mobile device;
      (c2) in response to step (c1), determining at the VMU that a SRWC channel between the VMU and the second mobile device is not the same as the SRWC channel selected in the ECSA mode;
      (c3) in response to step (c2), sending a message from the VMU to the second mobile device instructing the second mobile device to use the same SRWC channel selected in the ECSA mode.

13. The method of claim 12, wherein the SRWC connection between the VMU and the second mobile device is a Wi-Fi Direct connection.

14. The method of claim 12, further comprising: controlling the second mobile device at the VMU so that the second mobile device follows the SRWC channel used by the first mobile device, wherein the controlling step comprises: while the VMU is operating as the client (with respect to the second mobile device) and the second mobile device is operating as the server (with respect to the VMU), repeating steps (c1), (c2), and (c3).

15. The method of claim 12, wherein the second mobile device is operating application software that is responsive to the message sent from the VMU so that when the second mobile device receives the message, the application software thereon triggers a selection of a new SRWC channel between the VMU and the second mobile device that is the same as the current SRWC channel between the VMU and the first mobile device.

16. The method of claim 12, wherein the message identifies the channel designated in the ECSA mode, wherein the second mobile device is operating application software that is responsive to the message sent from the VMU so that when the second mobile device receives the message, the application software thereon triggers an ECSA-override mode in response to receiving the message from the VMU, wherein, in the ECSA-override mode, the second mobile device changes the SRWC channel between it and the VMU to the channel selected in the ECSA mode.

17. The method of claim 12, wherein, in response to step (c2), further comprising sending an instruction from the VMU to the second mobile device to disable standard operation of ECSA at the second mobile device.

18. The method of claim 12, wherein the VMU operates concurrently in at least two of the following modes: an access point mode, a group client mode, a group owner mode.

* * * * *